United States Patent [19]

Majerus

[11] Patent Number: 4,681,344
[45] Date of Patent: Jul. 21, 1987

[54] SAFETY HOLD-DOWN BAR SYSTEM

[76] Inventor: Howard J. Majerus, Rte. 2, Osakis, Minn. 56360

[21] Appl. No.: 781,041

[22] Filed: Sep. 27, 1985

[51] Int. Cl.$^4$ .......................................... B60R 21/00
[52] U.S. Cl. ................................... 280/751; 297/488
[58] Field of Search ..................... 280/748, 751, 753; 297/487, 488; 104/241; 105/329 R; 244/122 R, 121, 122 AG

[56] References Cited

U.S. PATENT DOCUMENTS

| | | | |
|---|---|---|---|
| 3,494,633 | 2/1970 | Malloy | 297/487 |
| 3,762,768 | 10/1973 | Hyde et al. | 297/488 |
| 3,827,752 | 8/1974 | Bissinger, Sr. | 297/488 |
| 4,509,798 | 4/1985 | Strothers | 297/487 |

FOREIGN PATENT DOCUMENTS 449771  3/1913  France ................................ 104/241

Primary Examiner—John A. Pekar
Assistant Examiner—Karin L. Ferriter
Attorney, Agent, or Firm—John W. Adams

[57] ABSTRACT

A hold-down safety bar system for restraining vehicle passengers, particularly adapted for use in school buses which includes a pivotally mounted hold-down bar unit with means for securing the same in passenger-restraining position, but permitting the same to be swung into inoperative position for easy access to the bus seat.

4 Claims, 4 Drawing Figures

SAFETY HOLD-DOWN BAR SYSTEM

SUMMARY OF THE INVENTION

This is a safety hold-down bar system particularly adapted for buses such as school buses and the like, which includes a substantially straight bar portion having forwardly extending connecting arms integrally formed therewith with the forward ends of the connecting arms pivotally mounted on suitable supporting pivot pins connected adjacent the back of the adjacent forward seat to permit the bar and supporting arm unit to be swung upwardly into retracted position or downwardly into safety hold-down position adjacent the laps of the passengers on the rearwardly disposed seat and provided with a hold-down strap having a releasable latch mechanism for holding the bar in operative passenger restraining position.

DETAILED DESCRIPTION OF THE PREFERRED EMBODIMENT

Figure 1:
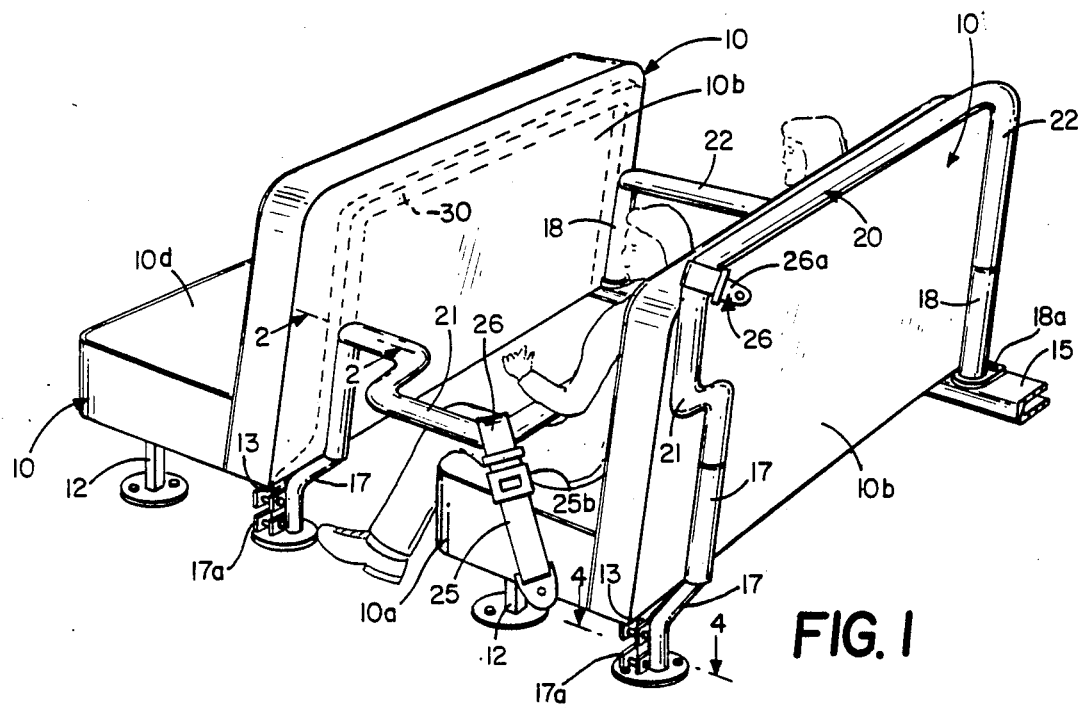
FIG. 1 is a perspective view showing two of the seats in a school bus with my hold-down device in operative position.

A pair of conventional school bus seats 10 are illustrated in FIG. 1. The seats 10 have seat portions 10a and back portions 10b. The seats 10 are supported at their aisle ends on suitable legs 12 and 13 which are anchored to the floor frame of the school bus. The outer window ends of the seat are anchored to the bus frame such as by being mounted on a conventional step rail 15 illustrated. A seat back frame 30 is rigidly connected to the frame for the seat portion 10a and the leg 13, and extends upwardly from the leg 13 to the top of the seat back 10b, across the seat back 10b, and downwardly to the frame for the seat at the window side thereof.

A pair of supporting struts 17 and 18 are respectively fixed as by clamping bracket 17a to the bus frame. The struts 17 and 18 are disposed rearwardly of the upstanding portions of the seat back frame 30 as indicated by the dotted lines in FIG. 1 to provide additional reinforcement for said struts. The aisle strut 17 is clamped to the rear leg 13 of the forwardly disposed seat 10 and extends upwardly therefrom along the seat back to the desired height. The window or outer strut or post 18 is bolted by bolt 18a to the step unit 15 as illustrated and extends with its upper end being disposed at the same elevation as the aisle strut 17.

Figure 2:
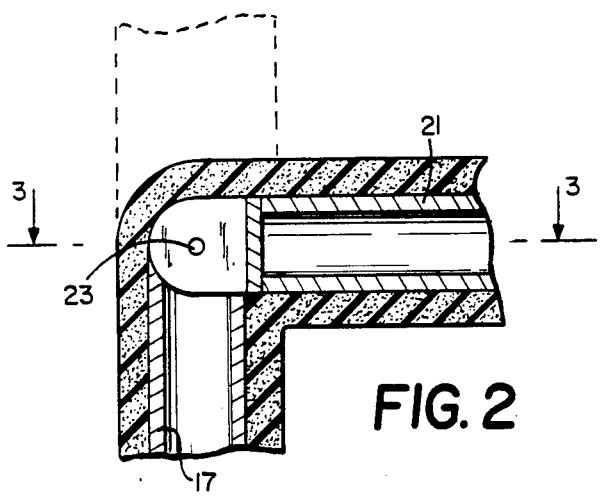
FIG. 2 is a fragmentary sectional view taken substantially along the line 2—2 of FIG. 1.
Figure 3:
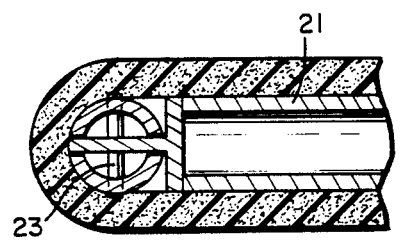
FIG. 3 is a sectional view taken substantially along the line 3—3 of FIG. 2.
Figure 4:
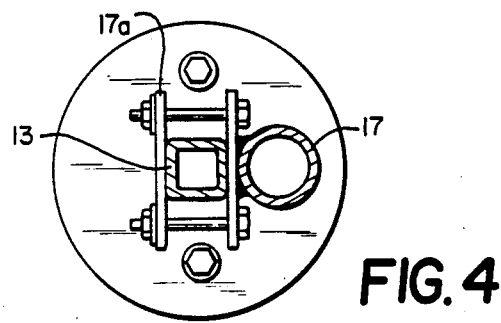
FIG. 4 is a fragmentary sectional view taken substantially along the line 4—4 of FIG. 1.

A hold-down bar unit designated by the numeral 20 has a pair of forwardly extending connecting arms 21 and 22 integrally formed therewith and having their forward ends pivotally connected to the top of the respective struts 17 and 18 as by the pivot pins 23 best shown in FIGS. 2 and 3. The connecting arm 21 has an inwardly offset bend to position the inner (aisle) end of the hold-down bar 20 substantially adjacent to the outer edge of the seat member 10a. The lower edge of the connecting arms 21 and 22 abut the upper edges of the respective strut member 17 and 18 to provide a stop for normal restraining positioning of the bar 20.

Suitable hold-down means are provided to maintain the cross bar 20 in restraining position such as the snap-together strap assembly illustrated in FIG. 1 which includes a lower strap segment 25 connected to the lower portion of the frame of seat 10a and an upper strap assembly 26 connected with the aisle end of the hold-down bar 20 as by being clamped therewith. The upper segment 26 has a male latch element 26a which is received in the conventional releasable female latch element 25b as illustrated.

The entire hold-down bar system has a suitable plastic covered foam pad surrounding the structural portion thereof to prevent injury and the forward ends of the connecting bar elements 21 and 22 are rounded to prevent damaging of the back portion of the forwardly disposed seat as best shown in FIGS. 2 and 3.

It will be seen that I have provided an extremely simple, easily installed safety hold-down bar system especially adapted for use in school buses and the like, which provides an effective device for restraining the passengers in their seats in case of accident and also permits the driver of the bus to quickly inspect the anchoring hold-down strap to be sure it is secured without getting out of his seat. It should be pointed out that such a safety restraining system will also prevent the passengers from moving around the bus while traveling. This is particularly important for school bus usage.

What is claimed is:

1. A safety hold-down bar system for restraining passengers in combination with a multiple seat bus, said system comprising, a multiple seat bus having side windows and a central aisle with rows of seats on both sides of the aisle and a driver's seat in the front of the bus with a rear view mirror positioned to permit the driver view the inner aisle ends of the seats, a pair of upstanding support struts mounted in fixed relation adjacent the back of each seat disposed forwardly of the seat in which the passengers are to be restrained, a continuous, substantially U-shaped restraining bar unit extending substantially the full width of the seat from the window to the aisle end thereof and pivotally mounted on said struts for swinging movement from upstanding, substantially vertical, inoperative position downwardly into restraining operative position in engagement with the lap of each seated passenger, and releasable means located at the aisle end of the bar unit within view from the driver's seat for anchoring the U-shaped bar in downward restraining position.

2. The structure set forth in claim 1 and said strut and bar system being surrounded by protective padding.

3. The structure set forth in claim 1 and said anchoring means comprising a strap unit anchored at its lower end to the passenger seat and having a releasable latch mechanism at the upper end for connecting the same to the aisle end and rear portion of the bar.

4. The structure set forth in claim 1 and the hold-down bar having an inwardly offset portion at the aisle end thereof to extend the bar inwardly the full width of the seat for the passengers to be restrained.

* * * * *